(12) United States Patent
Rao et al.

(10) Patent No.: US 7,154,709 B2
(45) Date of Patent: Dec. 26, 2006

(54) SLIDER WITH RECESSED PRESSURIZATION SURFACES

(75) Inventors: Ram M. Rao, Shoreview, MN (US); Zine-Eddine Boutaghou, North Oaks, MN (US); John R. Pendray, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 350 days.

(21) Appl. No.: 10/727,374

(22) Filed: Dec. 4, 2003

(65) Prior Publication Data

US 2004/0150916 A1    Aug. 5, 2004

Related U.S. Application Data

(63) Continuation-in-part of application No. 09/832,050, filed on Apr. 10, 2001, now Pat. No. 6,678,119.

(60) Provisional application No. 60/196,664, filed on Apr. 12, 2000.

(51) Int. Cl.
    *G11B 5/60*    (2006.01)
(52) U.S. Cl. .................................. 360/235.8; 360/236.3
(58) Field of Classification Search ............. 360/235.8, 360/236.3
    See application file for complete search history.

(56) References Cited

U.S. PATENT DOCUMENTS

| | | | |
|---|---|---|---|
| 4,734,803 A | 3/1988 | Nishihira | 360/103 |
| 5,267,109 A | 11/1993 | Chapin et al. | 360/103 |
| 5,299,079 A | 3/1994 | Kuroda | 360/103 |
| 5,726,830 A | 3/1998 | Koishi et al. | 360/103 |
| 5,889,637 A | 3/1999 | Chang et al. | 360/103 |
| 5,940,249 A | 8/1999 | Hendriks | 360/103 |
| 6,181,519 B1 | 1/2001 | Kim | 360/236.6 |
| 6,212,032 B1 | 4/2001 | Park et al. | 360/103 |
| 6,262,970 B1 | 7/2001 | Hu | 369/300 |
| 6,411,468 B1 | 6/2002 | Park et al. | 360/236.3 |
| 6,421,205 B1 | 7/2002 | Dorius et al. | 360/236.5 |
| 6,462,909 B1 | 10/2002 | Boutaghou et al. | 360/235.8 |
| 6,466,408 B1 | 10/2002 | Baumgart et al. | 360/235.7 |
| 6,490,135 B1 * | 12/2002 | Sannino et al. | 360/235.8 |
| 6,501,621 B1 | 12/2002 | Griffin et al. | 360/235.6 |
| 6,504,682 B1 * | 1/2003 | Sannino et al. | 360/238.8 |
| 6,510,027 B1 | 1/2003 | Chapin et al. | 360/235.8 |
| 6,515,831 B1 | 2/2003 | Sannino et al. | 360/235.6 |
| 6,525,909 B1 | 2/2003 | Qian et al. | 360/235.7 |
| 6,552,876 B1 | 4/2003 | Berg et al. | 360/235.7 |
| 6,560,071 B1 | 5/2003 | Chapin et al. | 360/235.7 |

(Continued)

FOREIGN PATENT DOCUMENTS

JP    61170922    8/1986

(Continued)

*Primary Examiner*—Jefferson Evans
(74) *Attorney, Agent, or Firm*—Westman, Champlin, & Kelly, P.A.

(57) ABSTRACT

One embodiment of the present invention pertains to a slider that includes an aerodynamic surface which includes a first bearing surface, a cavity floor, and a first recessed pressurization surface. The first bearing surface is disposed on the aerodynamic surface, defining a bearing height. The cavity floor is disposed on the aerodynamic surface at a cavity depth below the bearing height. The first recessed pressurization surface is adapted to provide above-ambient fluid pressure when the slider is in nominal flight, which is greater than fluid pressure provided elsewhere on a trailing half of the aerodynamic surface at a substantial displacement from a longitudinal centerline of the aerodynamic surface. The first recessed pressurization surface is disposed on the aerodynamic surface at a recessed depth which is between the bearing height and the cavity depth.

20 Claims, 6 Drawing Sheets

U.S. PATENT DOCUMENTS

| | | | |
|---|---|---|---|
| 6,574,190 B1 | 6/2003 | Hu | 369/300 |
| 6,583,961 B1 | 6/2003 | Levi et al. | 360/236.8 |
| 6,646,831 B1 | 11/2003 | Takagi et al. | 360/236.9 |
| 6,937,440 B1 * | 8/2005 | Rajakumar et al. | 360/236.2 |
| 6,980,399 B1 * | 12/2005 | Rajakumar et al. | 360/235.5 |

FOREIGN PATENT DOCUMENTS

| | | |
|---|---|---|
| JP | 2049281 | 2/1990 |
| JP | 2053256 | 2/1990 |
| JP | 6-124562 | 6/1994 |

* cited by examiner

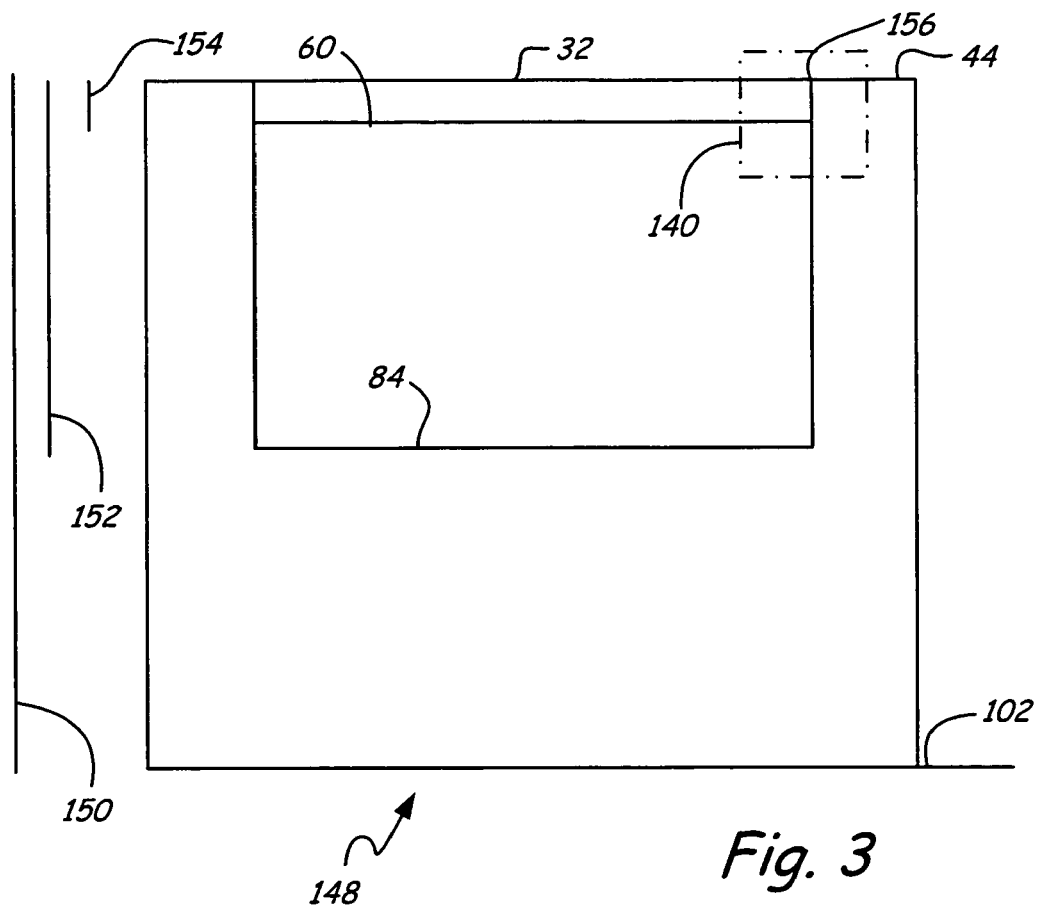
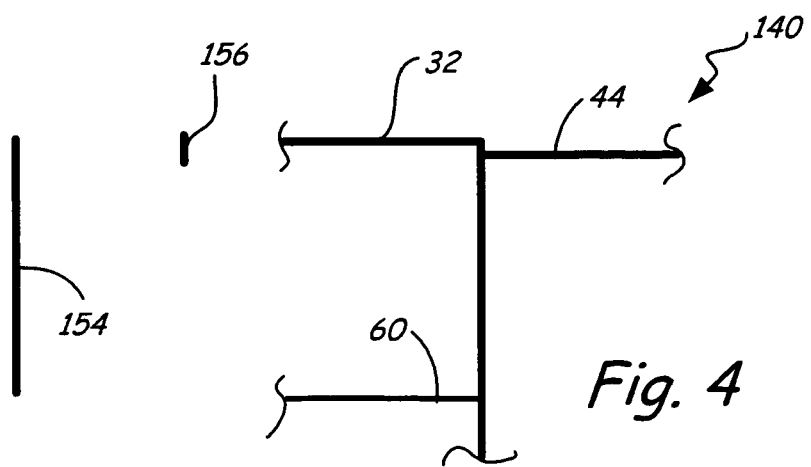

ns us. 7,154,709 B2

SLIDER WITH RECESSED PRESSURIZATION SURFACES

CROSS-REFERENCE TO RELATED APPLICATIONS

This application is a continuation-in-part of and claims the benefit of U.S. Non-Provisional application Ser. No. 09/832,050, entitled "DISC HEAD SLIDER HAVING RAILS WITH ENCLOSED DEPRESSIONS", filed Apr. 10, 2001 now U.S. Pat. No. 6,678,119, which in turn claims the benefit of U.S. Provisional Application Ser. No. 60/196,664, entitled "ENCLOSED DEPRESSION ON AIR BEARING SLIDER", filed Apr. 12, 2000, both of which are incorporated by reference herein.

FIELD OF THE INVENTION

The present invention relates generally to sliders, and more particularly but not by limitation, to sliders with advanced air bearing properties for pitch, roll, and vertical height.

BACKGROUND OF THE INVENTION

Data storage systems often include a slider involved in reading from and/or writing to a data storage medium. For example, disc drives are one popular form of data storage systems. Disc drives use rigid discs that include a storage medium for storage of digital information in a plurality of circular, concentric data tracks. The discs are mounted on a spindle motor which causes the discs to spin and the surfaces of the discs to pass under respective sliders. Such sliders use a fluid such as air to supply an aerodynamic bearing force, which is typically counteracted by a load force. The sliders carry data interface heads, such as transducers, which write information to and/or read information from the disc surfaces.

A long-running objective in data storage systems has been to increase the density of data storage within a given area of data storage media. In pursuit of this objective, it is desired to reduce the height at which a slider flies over a data storage media surface. To accomplish this reduction in fly height while maintaining reliable performance, it is required to reduce the uncertainty and inconsistency in the fly height of the slider.

Embodiments of the present invention provide solutions to these and other problems, and offer other advantages over the prior art.

SUMMARY OF THE INVENTION

One embodiment of the present invention pertains to a slider that includes an aerodynamic surface which includes a first bearing surface, a cavity floor, and a first recessed pressurization surface. The first bearing surface is disposed on the aerodynamic surface, defining a bearing height. The cavity floor is disposed on the aerodynamic surface at a cavity depth below the bearing height. The first recessed pressurization surface is adapted to provide above-ambient fluid pressure when the slider is in nominal flight, which is greater than fluid pressure provided elsewhere on a trailing half of the aerodynamic surface at a substantial displacement from a longitudinal centerline of the aerodynamic surface. The first recessed pressurization surface is disposed on the aerodynamic surface at a recessed depth which is between the bearing height and the cavity depth.

Another embodiment of the present invention pertains to a slider that includes an aerodynamic surface which includes a leading edge, a trailing edge, a leading bearing surface, a trailing bearing surface, a cavity floor, a first recessed pressurization surface, and a second recessed pressurization surface. The leading bearing surface is disposed on the aerodynamic surface substantially proximate to the leading edge at a bearing height. The trailing bearing surface is disposed on the aerodynamic surface substantially proximate to the trailing edge at the bearing height. The cavity floor is disposed on the aerodynamic surface at a cavity depth below the bearing height. The first and second recessed pressurization surfaces are disposed on the aerodynamic surface nearer to the trailing edge than is the leading bearing surface, at a recessed depth that is between the bearing height and the cavity depth and at most about 550 angstroms below the bearing height. The first and second recessed pressurization surfaces each comprise a convergent channel, and are each adapted to provide above-ambient fluid pressure when the slider is in nominal flight.

Another embodiment of the present invention pertains to a slider including an aerodynamic surface which includes a bearing surface disposed on the aerodynamic surface at a bearing height; a cavity floor disposed on the aerodynamic surface at a cavity depth below the bearing height; and means, disposed on the aerodynamic surface between the bearing height and the cavity depth, for providing above-ambient pressure when the slider is in a substantially nominal flying mode during nominal operation of a system in which the slider is incorporated.

Other features and benefits that characterize embodiments of the present invention will be apparent upon reading the following detailed description and review of the associated drawings.

BRIEF DESCRIPTION OF THE DRAWINGS

FIG. 3 depicts a forward plan view of a portion of the aerodynamic surface of a slider, according to one embodiment.

FIG. 4 depicts an exploded view of part of the portion of the aerodynamic surface of the slider of FIG. 3, according to one embodiment.

DETAILED DESCRIPTION OF ILLUSTRATIVE EMBODIMENTS

Figure 1:
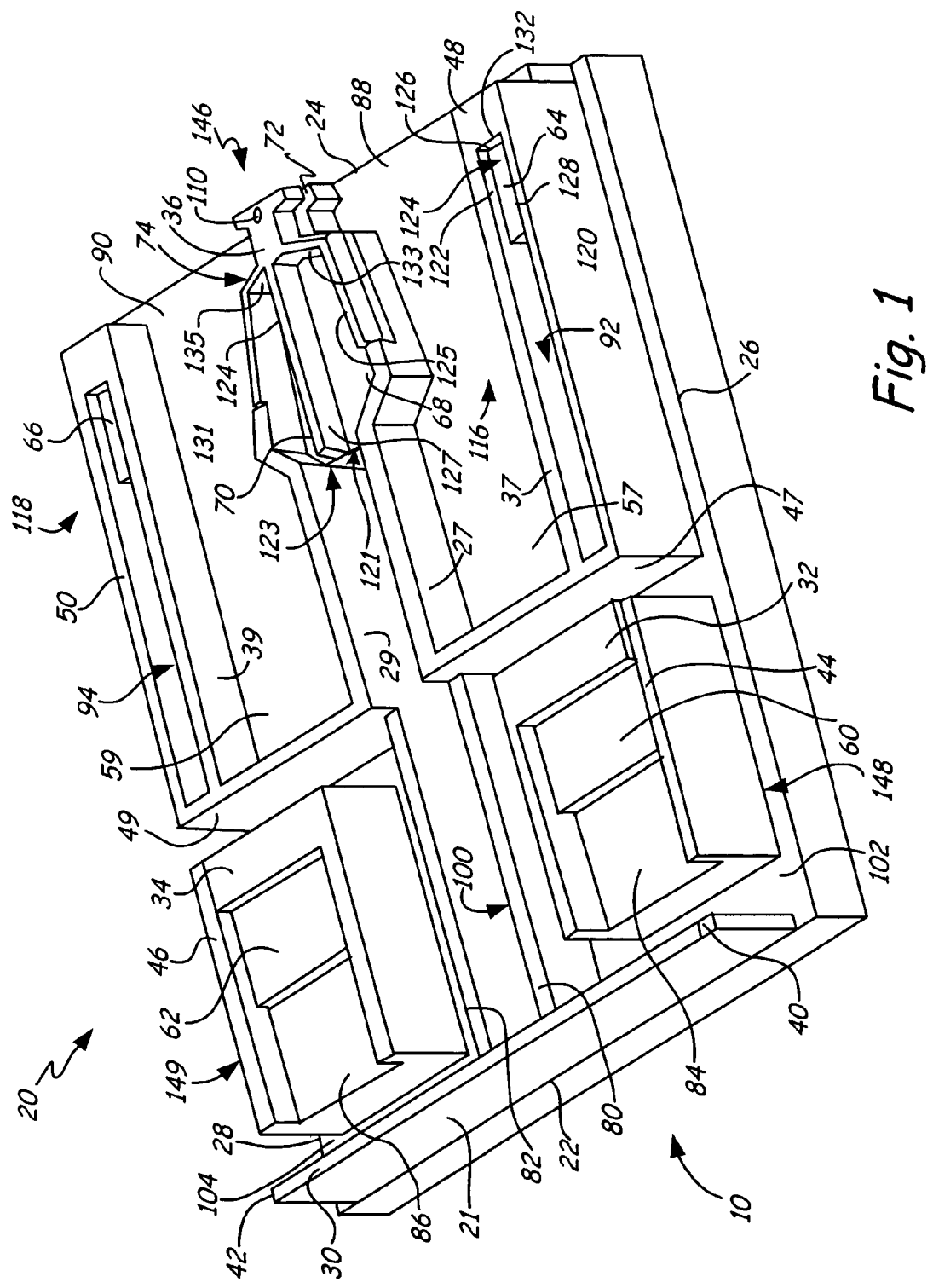
FIG. 1 depicts a perspective view of a slider including aerodynamic surface, according to one embodiment.
Figure 2:
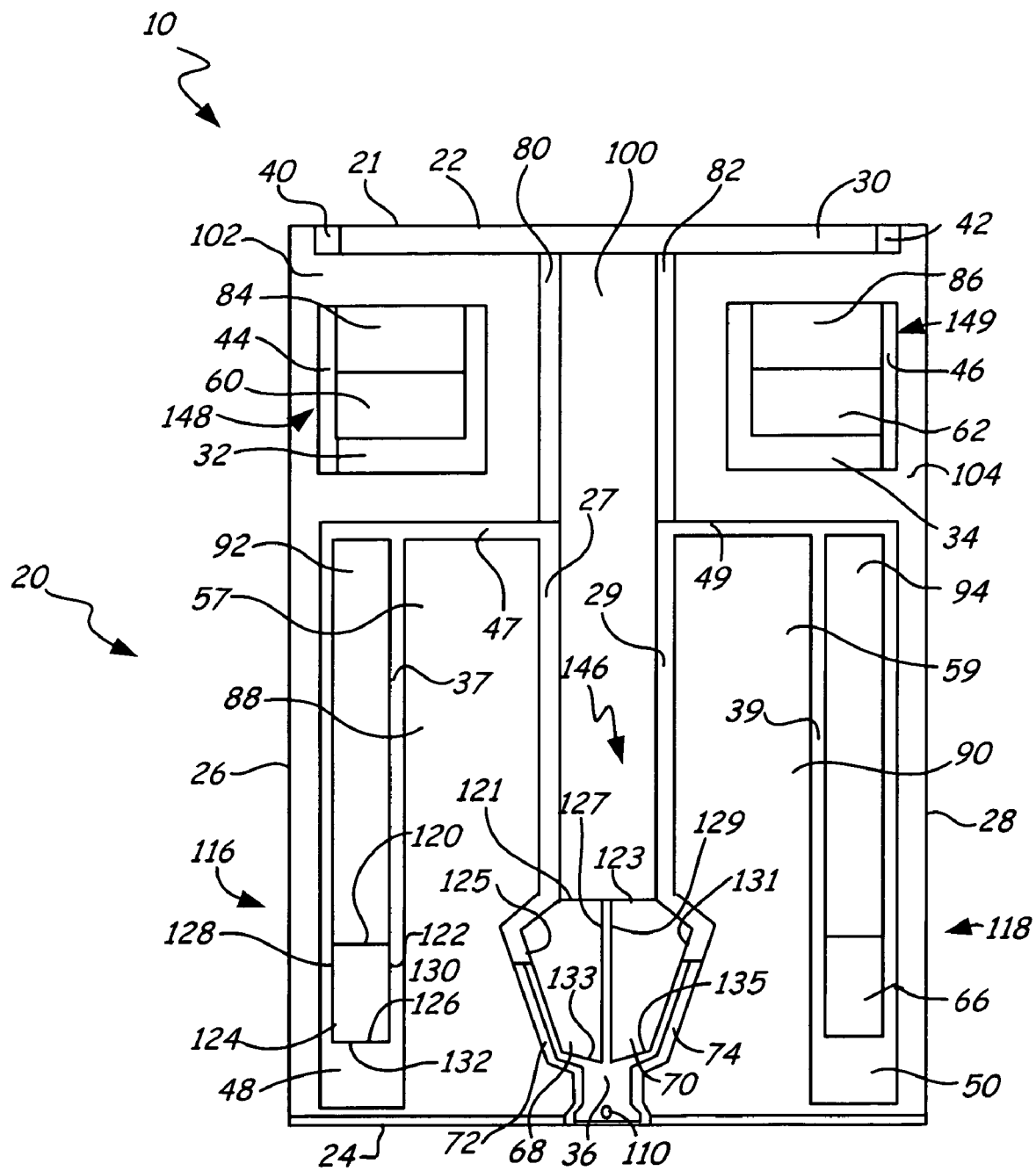
FIG. 2 depicts a top plan view of the aerodynamic surface of a slider, according to one embodiment.

FIG. 1 is a perspective view of a slider 10 including aerodynamic surface 20, according to one embodiment. FIG. 2 depicts a top plan view of the aerodynamic surface 20 of slider 10. Slider 10 serves as a representative example of various possible types of embodiments of the present invention.

In FIGS. 1 and 2, aerodynamic surface 20 has a leading edge 22, a trailing edge 24, a left side edge 26 and a right side edge 28. Aerodynamic surface 20 includes a variety of features at a number of different depths, including a recessed depth, a step depth, a cavity depth, and a deep cavity depth, all of which are measured in reference to a bearing height, at which bearing surfaces are disposed. The various surfaces at different depths of aerodynamic surface 20 may be formed by any of several well-known and newer manufacturing techniques, including ion milling, reactive ion etching, chemical etching, or lapping, for example. The depths have been depicted in FIG. 1 in exaggerated and disproportionate form to aid in perceiving detail.

Among the purposes of these various features at different depths is to provide slider 10 with a pattern of differential pressurization that is adapted to provide advantageous properties of pitch torque stiffness, roll stiffness, fly height precision and other characteristics of slider motion. Different embodiments therefore include surfaces that are adapted to provide above-ambient pressurization, or local pressurization of an ambient fluid that is above the ambient pressure of that fluid. Particular embodiments include sub-ambient pressurization features as well, adapted to provide pressurization that is locally below that of the ambient pressure of the fluid. These surfaces are adapted to provide such pressurization characteristics such that they provide these characteristics when the slider 10 is engaged in a nominal flying motion within a system (not shown), such as a data storage system, within which slider 10 is incorporated.

The above-ambient pressurization surfaces of aerodynamic surface 20 include bearing surfaces 32, 34, and 36, which are adapted to provide above-ambient pressurization during nominal flight of slider 10, and which define the bearing height. Aerodynamic surface 20 also includes recessed pressurization surfaces 48 and 50, which are also adapted to provide above-ambient pressurization during nominal flight of slider 10. Recessed pressurization surfaces 48 and 50 are among a number of recessed surfaces disposed on the aerodynamic face 20 at a recessed depth below the bearing height.

When slider 10 is in nominal flight as incorporated in a nominally operating system, such as a data storage system, a fluid flows across aerodynamic surface 20 from the general direction of leading edge 22 toward the general direction of trailing edge 24. It is the interaction of this fluid flow with the various features of the aerodynamic surface at the various depths, that provides advantageous properties of motion for slider 10, including the above-ambient pressurization provided by bearing surfaces 32, 34 and 36 and recessed pressurization surfaces 48 and 50.

Surface 30 is also a surface at the bearing height, although it typically does not provide bearing pressurization. Rather, bearing height surface 30 defines much of the top of leading wall 21. Leading wall 21 protects aerodynamic surface 20 from incoming contaminant particles during nominal flight of slider 10.

Recessed surfaces 40 and 42 are disposed on the outer portions of the top of leading wall 21 and, like bearing height surface 30, do not typically contribute to pressurization. Recessed surfaces 44 and 46 are disposed along the outer portions of leading aerodynamic features 148 and 149. Recessed surfaces 40, 42, 44, 46, 48 and 50 are disposed at the recessed depth, and facilitate roll clearance of slider 10. That is, because the recessed surfaces 40, 42, 44, 46, 48 and 50 are disposed at a recessed depth lower than the bearing height, slider 10 has a greater range of roll at a given vertical height above a nearby surface (not shown) during nominal flight of slider 10, without contacting the nearby surface. While recessed surfaces 40, 42, 44, 46, 48 and 50 are substantially flat in the present embodiment, there are alternative embodiments in which recessed surfaces 40, 42, 44, 46, 48 and 50 are tapered or otherwise have a depth that varies from one portion to another.

The recessed pressurization surfaces are disposed at the recessed depth, which is at most about 500 or 550 angstroms in some embodiments. In the exemplary slider 10, the recessed depth is 300 angstroms. The recessed depth has the characteristic that a surface at that recessed depth, like a bearing surface, is capable of providing above-ambient pressure on the slider due to interaction with the fluid flow during nominal flight of the slider 10. This occurs when the slider 10 is in a nominal flying mode, as opposed to transient flight events such as intermittent loading and unloading, depending on the specifications of a system in which the slider is incorporated.

Studies have indicated that a range from zero angstroms up to about 500 to 550 angstroms below the bearing height enables the property of providing an above-ambient fluid pressure during nominal slider flight in nominal operation as incorporated in a system, and that greater depths that are about or approximate to 550 angstroms are advantageous in some applications, depending on specifications such as ambient fluid density or speed of fluid flow relative to slider in flight that is nominal for that particular system. On the other hand, studies indicate that a surface at a depth that is more than at most about 550 angstroms, such as 1,000 angstroms or more, for example, is too deep to provide an above-ambient fluid pressure at nominal fly height during nominal slider operation in some applications, based on their particular specifications.

Aerodynamic face 20 also includes step surfaces disposed on the aerodynamic face 20 at a step depth below the bearing height, which is greater than the recessed depth. These include step surfaces 60, 62, 64, 66, 68, 70, 72 and 74. Step surfaces function advantageously, such as to serve as transition ramps between a cavity surface and a bearing surface or recessed pressurization surface. As a particular example, step surface 60 provides a transition ramp between cavity surface 84 and bearing surface 32. Other examples of advantageous function are apparent elsewhere in this description and in the figures. While step surfaces 60, 62, 64, 66, 68, 70, 72 and 74 are substantially flat in the present embodiment, there are alternative embodiments in which step surfaces 60, 62, 64, 66, 68, 70, 72 and 74 are tapered or otherwise have a depth that varies from one portion of a surface to another.

Sub-ambient pressurization is achieved by certain cavity and deep cavity surfaces in various embodiments, particularly when combined with a cavity dam and side rails. Aerodynamic face 20 includes cavity surfaces disposed on the aerodynamic face 20 at a cavity depth below the bearing height, which is greater than the step depth. These include cavity surfaces 80, 82, 84, 86, 88, 90, 92 and 94. These cavity surfaces generally define a cavity floor. The aerodynamic surface 20 also includes deep cavity surfaces at a deep cavity depth below the bearing height, which is greater than the cavity depth. These include deep cavity surfaces 100, 102 and 104. As with the step surfaces, the cavity surfaces 80-94 and deep cavity surfaces 100-104 are substantially flat in the present embodiment, while in other embodiments they are tapered or otherwise vary in depth.

Cavity dam 47, center rail 27, and side rail 37 are disposed on aerodynamic surface 20 such that their upper edges are substantially contiguous with recessed pressurization surface 48. In nominal operation of a system in which the slider is incorporated, a fluid flow expands as it is forced by the nominal motion of slider 10 relative to the fluid, to flow over cavity dam 47 into the greater volume of cavity 57, formed above cavity surface 88. Cavity 57 is kept at a pressure below the ambient fluid pressure by this constrained fluid expansion, during nominal flight of slider 10. Center rail 27 and side rail 37 aid in restricting fluid flow into cavity 57 to foster the condition of sub-ambient pressurization. Similarly, recessed pressurization surface 50 is situated in part as the top of cavity dam 49, center rail 29, and side rail 39, which bound a portion of cavity surface 90 to form cavity 59, where a local fluid flow is also constrained to achieve sub-ambient pressurization when the slider 10 is in nominal flight.

The outer trailing portions of recessed pressurization surfaces 48 and 50 each contribute in defining a convergent channel, 116 and 118. Left convergent channel 116 is labeled and discussed as representative of convergent channels that occur in the present embodiment and that occur in other configurations in other embodiments. A similar description applies, for example, to convergent channel 118. Convergent channel 116 includes channel inlet 120, which is open to fluid flow from the direction of leading edge 22, during nominal operation of slider 10. Convergent channel 116 also includes channel side walls 122 and 124, disposed from the channel inlet 120 in the direction of trailing edge 24; and channel dam 126, which is closed to fluid flow and disposed between channel side walls 122 and 124. The upper edge 130 of channel side wall 122 is substantially contiguous with recessed pressurization surface 48, as is the case for channel side wall 124. Similarly, upper edge 128 of channel side wall 124, and upper edge 132 of channel dam 126, are also substantially contiguous with recessed pressurization surface 48.

During operation, fluid flow along cavity surface 92 is bounded on either side by portions of recessed pressurization surface 48 and guided thereby to channel inlet 120 of convergent channel 116. There, the fluid flow is forced to rise up and over step surface 64. Step surface 64 is substantially flat in this embodiment but may have any variety of vertical configuration in alternative embodiments. The fluid flow is then bounded by channel walls 122 and 124, and flows against channel dam 126, which forces the fluid flow to spill over channel dam upper edge 132 to converge into an above-ambient pressurization flow along the trailing portion of recessed pressurization surface 48. This comprises localized above-ambient pressure gradients at discrete regions on recessed pressurization surface 48, rearward of channel dam 126. These localized above-ambient pressure gradients increase the roll stiffness of slider 10 and yield high peak pressures that dampen roll mode vibrations at the natural resonant frequencies of slider 10.

Trailing bearing feature 146 is a portion of aerodynamic surface 20 which includes trailing bearing surface 36, step surfaces 68, 70, 72 and 74, and adjoining portions of recessed pressurization surfaces 48 and 50 and of deep cavity surface 100. Trailing bearing feature 146 also comprises convergent channels wherein step surfaces 68 and 70 serve as channel floors. Fluid flow above deep channel surface 100 passes respectively through channel inlets 121, 123, over step surfaces 68, 70 to intercept channel side walls 125, 127, 129, and 131 and channel dams 133 and 135, which serve as the transition to trailing bearing surface 36. This structure converges the fluid flow into a positive pressurization on trailing bearing surface 36, similarly to the function described above for convergent channel 116.

Leading aerodynamic feature 148 is a portion of aerodynamic surface 20 which includes bearing surface 32, recessed surface 44, step surface 60, cavity surface 84, and part of the surrounding deep cavity surface 102. Leading bearing feature 148 is further discussed below in association with FIG. 3. Similarly, leading aerodynamic feature 149 is a portion of aerodynamic surface 20 which includes bearing surface 34, recessed surface 46, step surface 62, cavity surface 86, and part of the surrounding deep cavity surface 102.

While this embodiment is depicted with step surfaces at a single step depth, and cavity and deep cavity surfaces that have been divided between two different depths, the cavity depth and the deep cavity depth, other configurations occur in various embodiments. For example, it is possible for an embodiment to have surfaces at only three different depths, including a bearing height that forms the highest pressurization surface of the aerodynamic surface; a recessed depth, that also provides pressurization during nominal slider flight but at a depth that is recessed from the aerodynamic surface; and a cavity depth. It is also possible to have a number of distinct recessed depths, a number of distinct step depths, and a number of distinct cavity depths, or any combination of these depths. In addition, any surface below the bearing surface can be parallel, tapered, or otherwise unevenly configured relative to the bearing surfaces. In some embodiments, an aerodynamic face or its bearing surfaces have some curvature, in which case the depths of adjacent surfaces below the bearing surfaces are measured relative to the local bearing height after taking such curvature into account.

Aerodynamic surface 20 also includes data interface head 110, which is disposed substantially upon trailing bearing surface 36. Data interface head 110 includes, for example, a read/write transducer in this embodiment. Numerous different types of read and/or write heads are used in different embodiments, such as a magnetoresistive transducer or an optical head, for example.

As explained above, one purpose of the embodiment of slider 10 is to facilitate the achievement of an ultra-low fly height of slider 10 above a nearby surface, such as for example, a data media surface. One particular example of such a data media surface is a disc of a disc drive. Current constraints for achieving further reductions in slider fly height include lack of precision in vertical height, pitch, and roll of the slider. It is therefore desired to increase pitch stiffness and reduce pitch torque sensitivity in slider embodiments incorporated in a disc drive, as a particular example.

Aspects of the present embodiment that facilitate these goals are described above, and are further elaborated hereafter. For example, recessed pressurization surfaces 48 and 50 provide a positive fluid pressure substantially proximate to each of the two trailing corners of the aerodynamic surface 20, at nominal fly height. That is, recessed pressurization surfaces 48 and 50 are disposed substantially proximate both to trailing edge 24 and to side edges 26 and 28, respectively. Trailing recessed pressurization surfaces 48 and 50 are also disposed substantially between leading bearing surfaces 32 and 34 on one side, and trailing edge 24 on the other. For example, in this embodiment recessed pressurization surfaces 48 and 50 are depicted disposed within a few tens of microns of trailing edge 24, while left trailing recessed pressurization surface 48 is depicted within 100 microns from left side edge 26, and right trailing recessed pressurization surface 50 is depicted as disposed within 100 microns of right side edge 28. Other spacing ranges above or below these values occur in alternate embodiments.

At the same time, recessed pressurization surfaces 48 and 50 are recessed from the bearing height, and therefore allow for greater roll clearance of the slider, particularly at a significant pitch. Such a configuration provides advantages in optimizing between providing above-ambient fluid pressure substantially adjacent to trailing edge 24 and to side edges 26 and 28, while also optimizing slider roll clearance.

As another example of the advantages of the present embodiment, recessed surfaces 40 and 42 lie substantially between bearing surface 30 and side edges 26 and 28, respectively. Similarly, recessed surface 44 is disposed substantially between bearing surface 32 and left side edge 26, while recessed surface 46 is disposed substantially between bearing surface 34 and right side edge 28. These placements contribute to providing advantages in roll clearance at low pitch while continuing to provide desirable above-ambient fluid pressure.

FIG. 3 is a forward plan view of leading bearing feature 148, as seen from forward of the slider, i.e. from the direction of leading edge 22 (depicted in FIGS. 1 & 2). Leading bearing feature 148 forms a portion of the aerodynamic surface 20 (depicted in FIGS. 1 & 2). Aerodynamic feature 148 includes bearing surface 32, recessed surface 44, step surface 60, cavity surface 84, and deep cavity surface 102.

Whereas the proportions depicted in the perspective view of FIG. 1 were exaggerated to show detail, the portions depicted in FIG. 3 have been drawn to scale for one exemplary embodiment, to convey the relationship of the various depths of the various surfaces comprised in aerodynamic surface 20. Vertical segments 150, 152, and 154 are separate projections of the various depths, rather than depicting physical features. Particularly, vertical segment 150 represents the deep cavity depth of deep cavity surface 102; vertical segment 152 represents the cavity depth of cavity surface 84; and vertical segment 154 represents the step depth of step surface 102. Vertical segment 156, showing the measure of recessed depth of recessed surface 44 below the bearing height, is depicted integrally with the depiction of leading bearing feature 148.

Taking the level of the bearing surface 32 as the bearing height, which serves as the reference height against which all other depths are measured, the depths of the other surfaces are shown to scale for the present illustrative embodiment. Deep cavity 102 is disposed at a deep cavity depth 150 of 26,000 angstroms in this embodiment. The deep cavity depth 150 is generally two to three times the cavity depth 152 in certain embodiments. In some embodiments, the deep cavity depth is greater than 30,000 angstroms, as in the exemplary embodiment. In other embodiments, the cavity depth is less than 25,000 angstroms, for example, 20,000 angstroms. The deep cavity depth can be as little as only a few thousand angstroms greater than the cavity depth, or less.

In other embodiments, the cavity in general may include three or more different cavity depths rather than the two depicted here, i.e. the deep cavity depth 150 and the cavity depth 152. The difference between a cavity depth and a deep cavity depth and between various grades of cavity depths may be less than thousands of angstroms. The specifics of a particular embodiment are tailored according to the desired characteristics of that embodiment based on known aerodynamics.

The cavity surface 84 is at the cavity depth 152 below the bearing height. In this particular embodiment cavity depth 152 is 13,000 angstroms. The cavity depth will vary according to the particulars of various sub-ambient fluid pressure formations. The minimum cavity depth in some embodiments using sub-ambient fluid pressure is determined by how little depth is required in a particular embodiment to provide the appropriate sub-ambient fluid pressure in a cavity (such as 88 and 90 in FIGS. 1 and 2). In some embodiments, this may be as little as 5,000 or 3,000 angstroms.

Step surface 60 is disposed below bearing height by step depth 154. In this particular embodiment step depth 154 is depicted as 2,800 angstroms. The step depth generally varies from 1,000 to 5,000 angstroms or more in various embodiments, although the step depth remains less than the cavity depth in a particular embodiment.

Recessed surface 44 is recessed below the bearing height by recessed depth 156. Recessed depth 156 may be difficult to discern on the scale of FIG. 3 because it is substantially smaller than the dimensions of the other depths, particular deep cavity depth 150. FIG. 3 is therefore helpful in providing a proportional view of the differences between the different depths, particularly the great difference between recessed depth 156 and deep cavity depth 150. To aid in appreciation of the depictions, box 140 includes a small section of FIG. 3 which appears as an exploded view in FIG. 4.

FIG. 4 depicts an exploded view of the portion of leading bearing feature 148 that appears as box 140 in FIG. 3. FIG. 4 is therefore also a forward plan view of a small section of aerodynamic surface 20 of slider 10 (depicted in FIGS. 1 and 2). FIG. 4 depicts bearing surface 32 at the bearing height, which serves as the reference against which the depth all other surfaces are measured. Step surface 60 is depicted, again at step depth 154. Step depth 154 is again depicted to the side as a projection of the depth alone. The contrast of scale is apparent in the depiction in step surface 60 and step depth 154 between FIGS. 3 and 4.

Recessed surface 44 is recessed from the bearing height by the recessed depth 156. Recessed depth 156 is depicted to the side as a projection of the depth alone. In this embodiment, the recessed depth 156 has been proportionally depicted as 300 angstroms, as one example to illustrate a possible value thereof. The recessed depth is between 100 and 400 angstroms in several embodiments. In other embodiments, the recessed depth may be anything greater than zero up to about 550 angstroms.

A recessed depth of at most approximately 550 angstroms is advantageous in providing above-ambient pressure at nominal fly height, in particular embodiments of the slider 10. Other values for the recessed depth that are about or approximately 550 angstroms are advantageous in providing certain above-ambient fluid pressure properties in particular embodiments of the slider 10. The ultimate limit on recessed depth is defined by the particular specifications of a slider as incorporated in a system, for example, including speed of fluid flow relative to the slider, or ambient density of the fluid. Such particulars of an embodiment therefore determine the limits of depth for which a surface can provide an above-ambient pressure at a recessed height below the bearing height during nominal or near nominal slider flight.

Figure 5:
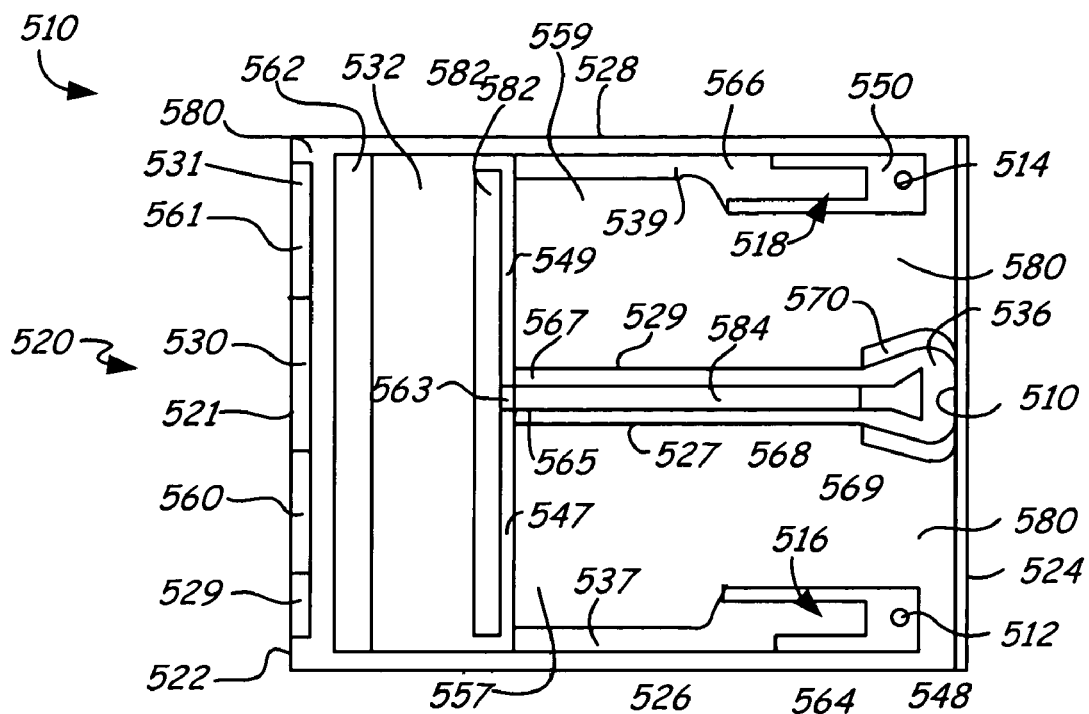
FIG. 5 depicts a top plan view the aerodynamic surface of a slider, according to one embodiment.

FIG. 5 depicts another example of an embodiment of slider 510, including aerodynamic surface 520. Aerodynamic surface 520 includes leading edge 522, trailing edge 524, left side edge 526 and right side edge 528, bearing surfaces 532 and 536, and trailing recessed pressurization surfaces 548 and 550. Aerodynamic surface 520 also includes leading wall 521, upon which are disposed bearing height surfaces 529, 530 and 531, and step surfaces 560 and 561. Aerodynamic surface 520 also includes step surfaces 562, 563, 564, 565, 566, 567, 568, 569 and 570, and cavity surfaces 580 and 582. (The label for 580 appears twice to clarify the extent of cavity surface 580). In this embodiment, aerodynamic surface 520 only comprises a single cavity depth and a single step depth.

Aerodynamic surface 520 also includes data interface head 510, disposed upon trailing bearing surface 536. Data interface head 510 includes, for example, a read/write transducer in this embodiment. Numerous different types of read and/or write heads are used in different embodiments, such as a magnetoresistive transducer or an optical head, for example.

Aerodynamic surface 520 also includes convergent channels 516 and 518 formed with a channel floor comprised of a step surface 564, 566 respectively, and a channel top contiguous with a recessed pressurization surface 548, 550 respectively. Convergent channels 516 and 518 constrain an ambient fluid flow to compress into an above-ambient pressurization as it passes over recessed pressurization surfaces 548 and 550 respectively, as is detailed above with reference to convergent channel 116.

Cavity 557 is comprised in cavity floor 580 and is bounded by cavity dam 547, center rail 527, and side rail 537. Similarly, cavity 559 is comprised in cavity floor 580 and is bounded by cavity dam 549, center rail 529, and side rail 539. Cavity dams 547 and 549 have top surfaces that are comprised in bearing surface 532. The top surface of center rail 527 includes step surface 565 and a portion of bearing surface 536, while the top surface of center rail 529 includes step surface 567 and a portion of bearing surface 536. The top surface of side rail 537 includes step surface 564, while the top surface of side rail 539 includes step surface 566. This configuration supports the sub-ambient pressurization functions of cavities 557 and 559, similar to those described above with reference to cavities 57 and 59, which aid in the precision of slider pitch and vertical height.

Aerodynamic surface 520 also includes landing pads 512 and 514 disposed substantially on recessed pressurization surfaces 548 and 550, respectively. Landing pads 512 and 514 are advantageous in providing safe points of contact between slider 10 and an opposing surface, such as a data storage medium, during an event outside of nominal slider flight, such as loading or unloading, or mechanical shock. Landing pads 512 and 514 are preferably made of a material that is significantly harder than the surrounding material of aerodynamic surface 20, such as diamond-like carbon (DLC).

Figure 6:
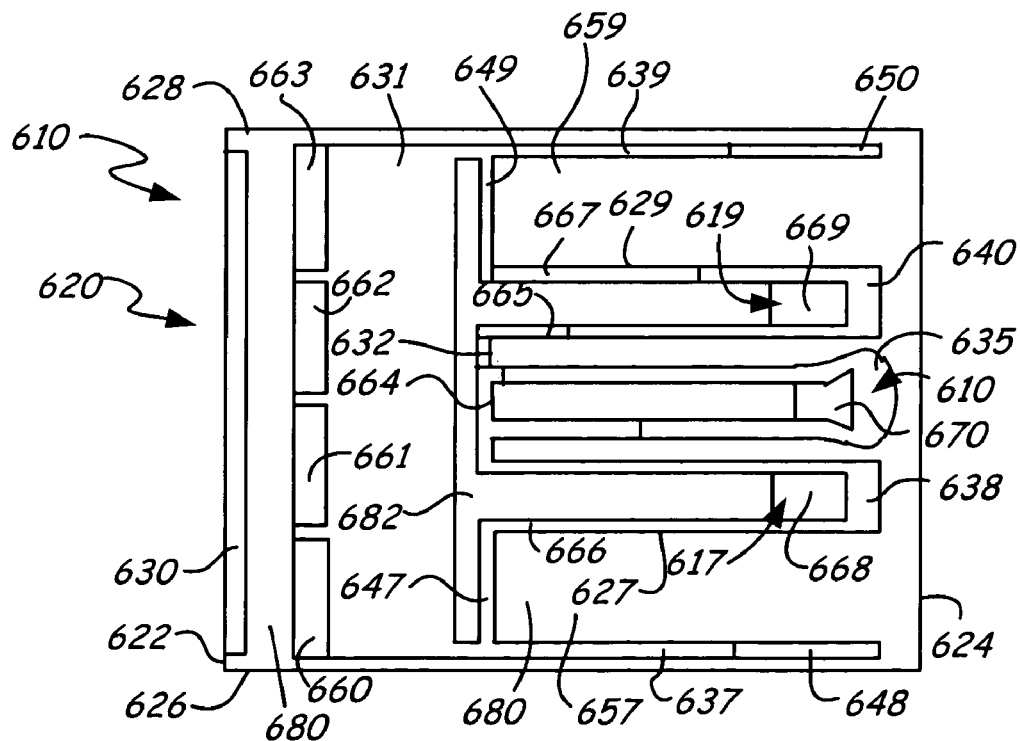
FIG. 6 depicts a top plan view the aerodynamic surface of a slider, according to one embodiment.

FIG. 6 is a top plan view of an aerodynamic surface 620 of a slider 610 according to another embodiment, illustrative of the variety of embodiments of a slider of the present invention. This embodiment includes leading edge 622, trailing edge 624, left side edge 626, right side edge 628, leading wall 630, leading bearing surface 631, small bearing height surface 632, trailing bearing surface 635, and recessed pressurization surfaces 638 and 640, which are disposed away from side edges 626 and 628, respectively. In this particular embodiment, for example, recessed pressurization surfaces 638 and 640 are depicted well over 100 microns from side edges 626 and 628, respectively. Other spacing dimensions greater and less than this range occur in alternate embodiments. Aerodynamic surface 620 also includes step surfaces 660, 661, 662, 663, 664, 665, 666, 667, 668, 669 and 670, and cavity surfaces 680, 682 and 684, but no deep cavity surface. Recessed pressurization surfaces 638 and 640, and step surfaces 668 and 669 respectively, form convergent channels 617 and 619 respectively.

Aerodynamic surface 620 also includes side trailing surfaces 648 and 650 at the recessed depth. In this embodiment, recessed surfaces 648 and 650 occur substantially proximate to both the trailing edge and to the left and right side edges, respectively, and do not comprise convergent channels. Recessed surfaces 648 and 650, along with portions of bearing surface 631, are formed along the tops of side rails 637 and 639. Side rail 637 combines with step rail 627 and cavity dam 647 to form cavity 657, while side rail 639 combines with step rail 629 and cavity dam 649 to form cavity 659. Cavities 657 and 659 are thus disposed to host sub-ambient pressurization during nominal flight of slider 610.

Recessed pressurization surfaces 638 and 640 and recessed surfaces 648 and 650 are thus disposed for a different optimization of pressure differential surfaces combined with roll clearance. In a similar alternative embodiment, surfaces analogous to 648 and 650 are step surfaces at the step depth while surfaces analogous to 638 and 640 are recessed pressurization surfaces at the recessed depth; in another, surfaces analogous to 638 and 640 are bearing surfaces at the bearing height, while surfaces analogous to 648 and 650 are at the recessed depth.

Figure 7:
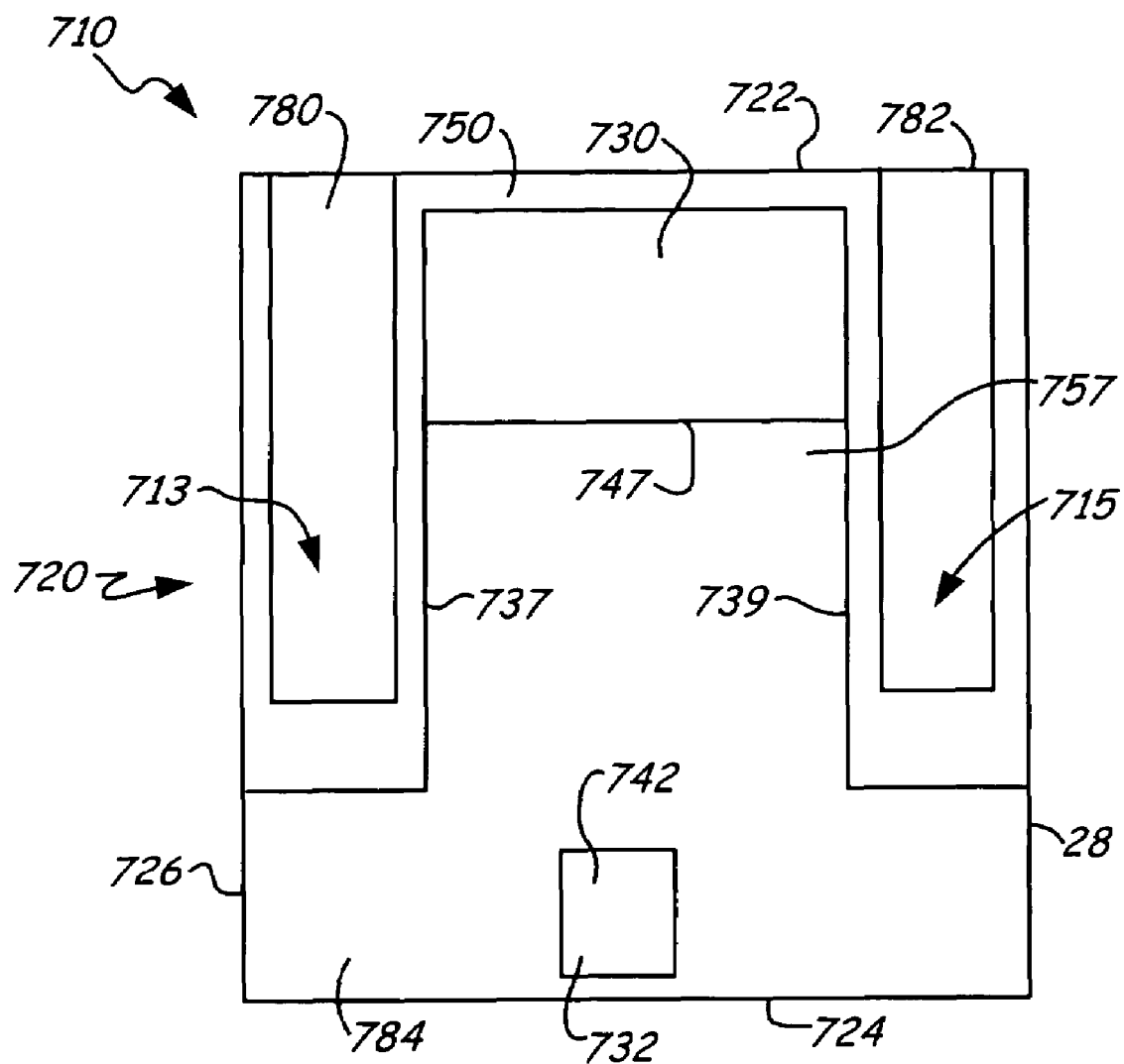
FIG. 7 depicts a top plan view the aerodynamic surface of a slider, according to one embodiment.

FIG. 7 is a top plan view of an aerodynamic surface 720 of a slider 710 according to another embodiment. Aerodynamic surface 720 has leading edge 722, trailing edge 724, left side edge 726, and right side edge 728. Aerodynamic surface 720 further has leading bearing surface 730 and trailing bearing surface 732. Aerodynamic surface 720 also has recessed pressurization surface 750 and trailing recessed surface 742. Aerodynamic surface 720 further has cavity surfaces 780, 782 and 784. Aerodynamic surface 720 has no surfaces at a separate deep cavity depth or step depth.

Portions of leading recessed pressurization surface 750 and cavity surface 780 form convergent channel 713, while portions of leading recessed pressurization surface 750 and cavity surface 782 form convergent channel 715. These convergent channels are thus different from those depicted as 116 and 118 or 615 and 617, such as in that their floor is comprised in cavity surfaces 780 and 782 at the cavity depth. Convergent channels 713 and 715 provide a different optimization for providing above-ambient pressurization to the trailing portions of recessed pressurization surface 750.

Convergent channels 713 and 715 are disposed substantially between leading bearing surface 730 and trailing edge 724, even though not directly between them. For instance, a straight line can be drawn from a portion of leading bearing surface 730 (e.g. the upper left portion) to a portion of trailing edge 724 (e.g. near the left corner with left side edge 726) which passes through or close to a portion of recessed pressurization surface 750 comprised in left convergent channel 713 (e.g. the trailing right corner), making a portion of recessed pressurization surface 750 disposed substantially between leading bearing surface 730 and trailing edge 724.

Bearing surfaces 730 and 732 are also optimized for above-ambient pressurization. In nominal flight of slider 710, fluid flow will be compressed by passing over the center leading portion of recessed pressurization surface 750 and then over leading bearing surface 730, and by passing over trailing recessed surface 742 and then over trailing bearing surface 732.

Cavity 757 is formed above a portion of cavity floor 784 substantially bounded by cavity dam 747 and side rails 737 and 739, and is therefore configured to provide sub-ambient pressurization during nominal flight of slider 710, similarly to the descriptions above. Cavity dam 747 substantially defines bearing surface 730 as its upper surface, while side rails 737 and 739 have upper edges contiguous with recessed pressurization surface 750. In alternative embodiments, the aerodynamic surface is configured only for above-ambient pressurization, and no cavity or cavity dam are used.

Figure 8:
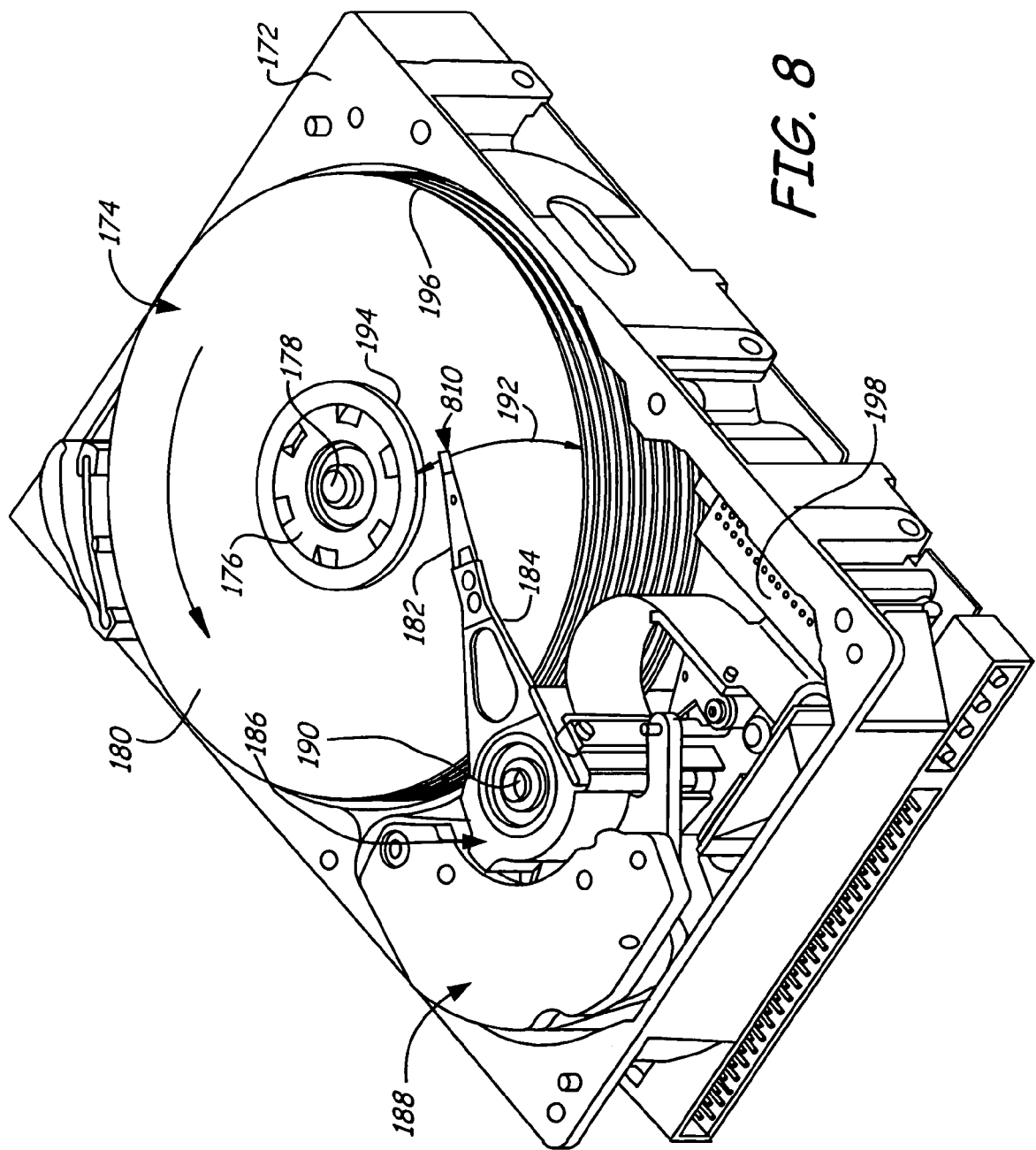
FIG. 8 depicts a perspective view of a system incorporating a slider, according to one embodiment.

FIG. 8 is a perspective view of an embodiment of a data storage system incorporating the present invention. Disc drive 170 is one example from the variety of data storage systems and other systems to which the present invention is applicable. Disc drive 170 includes a housing with a base 172 and a top cover (not shown). Disc drive 170 also includes a disc pack 174, which is mounted on a spindle motor (not shown) by a disc clamp 176. Disc pack 174 includes a plurality of individual discs which are mounted for co-rotation about central axis 178. Each disc surface has an associated slider 810 which is mounted to disc drive 170 and carries a read/write head (not shown) on slider 810 for communication with the disc surface 180.

In FIG. 8, representative slider 810 is supported by suspension 182 which in turn is mounted on track accessing arm 184 of actuator 186. Each disc surface is likewise interfaced by a similarly disposed slider (not shown). Suspension 182 supplies a load force to slider 810 which is substantially normal to opposing disc surface 180. The load force counteracts an aerodynamic lifting force developed between slider 810 and disc surface 180 during the rotation of disc pack 174, due to the flow of an ambient fluid, such as atmospheric air or argon for example, caused by the motion of disc surface 180. Actuator 186 is a rotary moving coil actuator and includes a voice coil motor, shown generally at 188. Voice coil motor 188 rotates actuator 186 about pivot shaft 190 to position slider 810 over an intended data track (not shown) along a slider range 192 between a disc inner diameter 194 and a disc outer diameter 196. Voice coil motor 188 operates under control of internal circuitry 198.

During nominal operation of disc drive 170, disc pack 174 is rotated at a nominal rotational speed, and spun up to or spun down from the nominal rotation speed depending on usage. Nominal rotation speed varies greatly from one embodiment to another, depending on the particular specifications of a slider and/or of a system in which the slider is incorporated. For example, one illustrative embodiment of a disc drive incorporating a slider has a nominal rotational speed of 7,200 revolutions per minute (RPM). Other illustrative rotational speeds of embodiments currently contemplated include 2,000 RPM, 5,400 RPM, and 15,000 RPM. Other rotational speeds both above and below these illustrative values are contemplated in alternate embodiments of disc drives and other systems incorporating a slider disposed opposite to a rotational body.

In an embodiment of a system incorporating a slider such as that depicted in FIG. 8, a local linear speed of a location on disc surface 180 is defined by multiplying the rotational speed of disc pack 174, in radians, by the local radius of rotation of the particular location on disc surface 180. The speed of the ambient fluid flow at a location occupied by slider 810 at a particular point in time is a function of the linear speed of the location on the disc surface 180, since friction of the disc surface with the ambient fluid drives the ambient fluid flow. The range of possible radii of rotation of locations on disc surface 180 capable of opposing slider 810, is bounded by the radii corresponding to the disc inner diameter 194 and the disc outer diameter 196. The disc outer diameter 196 varies widely in different embodiments, including approximately 9.5 centimeters, 6.3 centimeters, and 2.5 centimeters, for example. Many other disc outer diameters are contemplated in alternate embodiments, including greater and, particularly, smaller diameters than those specifically listed above. In addition, many other types of systems are contemplated which also incorporate a slider, in which the local linear speed of ambient fluid flow is a function of other characteristics, such as linear motion of a tape proximate to the slider, as one illustrative example.

A recessed pressurization surface on the aerodynamic surface of a slider has characteristics adapted to provide above-ambient fluid pressure when the slider is in nominal flight. Because of the vast variety of embodiments of sliders and systems in which those sliders are incorporated, the particular specifications of a recessed pressurization surface to adapt it to provide above-ambient fluid pressure when the slider is in nominal flight, also vary greatly as a function of the specifications of the particular context, including properties such as ambient fluid flow speed in the range of nominal operation of that system.

The present invention therefore includes unexpected and novel advantages as detailed herein and as can be further appreciated from the claims, figures, and description by those skilled in the art. Although particular embodiments such as this are described in reference to a disc drive as a particular form of data storage system, the present invention has various other embodiments with application to other data storage systems involving media including magnetic, magnetoresistive, optical, mechanical, and other data technologies, in disc, tape, floppy, and other mechanical formats. Similarly, in other embodiments a slider is disposed opposite a surface hosting locations defined in terms other than data tracks, wherein the present invention is also useful in providing advanced air bearing properties for pitch, roll, and vertical height.

It is to be understood that even though numerous characteristics and advantages of various illustrative embodiments of the invention have been set forth in the foregoing description, together with details of the structure and function of various embodiments of the invention, this disclosure is illustrative only, and changes may be made in detail, especially in matters of structure and arrangement of parts within the principles of the present invention, to the full extent indicated by the broad, general meaning of the terms in which the appended claims are expressed. It will be appreciated by those skilled in the art that the teachings of the present invention can be applied to a family of systems, devices, and means encompassed by and equivalent to the examples of embodiments described, without departing from the scope and spirit of the present invention. Further, still other applications for the sliders of the present invention are possible.

What is claimed is:

1. A slider comprising an aerodynamic surface which comprises:

a first bearing surface, disposed on the aerodynamic surface, defining a bearing height;

a cavity floor disposed on the aerodynamic surface at a cavity depth below the bearing height; and a convergent channel having at least one sidewall defining a first recessed pressurization surface, adapted to provide above-ambient fluid pressure when the slider is in nominal flight, which is greater than fluid pressure provided elsewhere on a trailing half of the aerodynamic surface at a substantial displacement from a longitudinal centerline of the aerodynamic surface; the first recessed pressurization surface being disposed on the aerodynamic surface at a recessed depth which is between the bearing height and the cavity depth;

wherein a portion of the first recessed pressurization surface is disposed substantially between the first bearing surface and a first side edge of the aerodynamic surface.

2. The slider of claim 1, wherein a portion of the first recessed pressurization surface is disposed substantially between the first bearing surface and the trailing edge, and extends to substantially proximate to the trailing edge.

3. A slider comprising an aerodynamic surface which comprises:
a first bearing surface, disposed on the aerodynamic surface, defining a bearing height;
a cavity floor disposed on the aerodynamic surface at a cavity depth below the bearing height;
a first recessed pressurization surface, adapted to provide above-ambient fluid pressure when the slider is in nominal flight, which is greater than fluid pressure provided elsewhere on a trailing half of the aerodynamic surface at a substantial displacement from a longitudinal centerline of the aerodynamic surface; the first recessed pressurization surface being disposed on the aerodynamic surface at a recessed depth which is between the bearing height and the cavity depth; and
a step surface disposed on the aerodynamic surface at a step depth below the bearing height that is between the recessed depth and the cavity depth.

4. The slider of claim 3, wherein the recessed depth is at most about 550 angstroms below the bearing height.

5. The slider of claim 3, wherein a portion of the step surface is disposed substantially adjacent to the first recessed pressurization surface and substantially between the first recessed pressurization surface and a first side edge of the aerodynamic surface.

6. The slider of claim 3, wherein the aerodynamic surface further comprises a second recessed pressurization surface disposed at substantially the recessed depth.

7. The slider of claim 6, wherein the second recessed pressurization surface is disposed substantially between first bearing surface and a trailing edge of the aerodynamic surface.

8. The slider of claim 6, wherein the aerodynamic surface further comprises a second bearing surface, the first recessed pressurization surface is disposed substantially between the first bearing surface and the trailing edge, and the second recessed pressurization surface is disposed substantially between the second bearing surface and the trailing edge.

9. The slider of claim 6, comprising at least three recessed surfaces disposed on the aerodynamic surface at substantially the recessed depth.

10. The slider of claim 3, wherein the first bearing surface is disposed substantially proximate to a trailing edge of the aerodynamic surface, and a data interface head is disposed substantially on the first bearing surface.

11. The slider of claim 3, wherein the first recessed pressurization surface comprises a convergent channel, comprising a channel inlet, open to fluid flow from a direction of a leading edge of the aerodynamic surface; channel side walls, disposed from the channel inlet toward a trailing edge of the aerodynamic surface; and a channel dam, closed to fluid flow, disposed between the channel side walls.

12. The slider of claim 11, wherein an upper edge of the channel side walls and an upper edge of the channel dam are substantially contiguous with the first recessed pressurization surface.

13. The slider of claim 3, further comprising a landing pad disposed substantially on the first recessed pressurization surface.

14. The slider of claim 3, wherein the aerodynamic surface further comprises a leading wall.

15. The slider of claim 3, wherein the slider comprises a data interface head.

16. A slider comprising an aerodynamic surface which comprises:
a first bearing surface, disposed on the aerodynamic surface, defining a bearing height;
a cavity floor disposed on the aerodynamic surface at cavity depth below the bearing height;
a first recessed pressurization surface, adapted to provide above-ambient fluid pressure when the slider is in nominal flight, which is greater than fluid pressure provided elsewhere on a trailing half of the aerodynamic surface at a substantial displacement from a longitudinal centerline of the aerodynamic surface; the first recessed pressurization surface being disposed on the aerodynamic surface at a recessed depth which is between the bearing height and the cavity depth; and
a deep cavity surface disposed on the aerodynamic surface at a deep cavity depth that is greater than the cavity depth.

17. A slider comprising an aerodynamic surface which comprises:
a leading edge and a trailing edge;
a leading bearing surface disposed on the aerodynamic surface substantially proximate to the leading edge at a bearing height;
a trailing bearing surface disposed on the aerodynamic surface substantially proximate to the trailing edge at the bearing height;
a cavity floor disposed on the aerodynamic surface at a cavity depth below the bearing height;
a first recessed pressurization surface and a second recessed pressurization surface disposed on the aerodynamic surface nearer to the trailing edge than is the leading bearing surface, at a recessed depth that is between the bearing height and the cavity depth and at most about 550 angstroms below the bearing height, the first and second recessed pressurization surfaces each comprising a convergent channel, and being adapted to provide above-ambient fluid pressure when the slider is in nominal flight; and
a step surface disposed on the aerodynamic surface at a step depth below the bearing height that is between the recessed depth and the cavity depth.

18. The slider of claim 17, further comprising a third recessed surface and a fourth recessed surface disposed on the aerodynamic surface at substantially the recessed depth.

19. A slider comprising an aerodynamic surface which comprises:
a bearing surface disposed on the aerodynamic surface at a bearing height;
a cavity floor disposed on the aerodynamic surface at a cavity depth below the bearing height; and
means, disposed on the aerodynamic surface between the bearing height and the cavity depth, for providing above-ambient pressure when the slider is in a substantially nominal flying mode during nominal operation of a system in which the slider is incorporated, wherein the means for providing above ambient pressure is disposed on the aerodynamic surface at a means depth below the bearing height; and
a step surface disposed on the aerodynamic surface at a step depth below the bearing height that is between the means depth and the cavity depth.

20. The slider of claim 19, wherein the means depth is at most about 550 angstroms below the bearing height.

* * * * *

UNITED STATES PATENT AND TRADEMARK OFFICE
CERTIFICATE OF CORRECTION

| | |
|---|---|
| PATENT NO. | : 7,154,709 B2 |
| APPLICATION NO. | : 10/727374 |
| DATED | : December 26, 2006 |
| INVENTOR(S) | : Rao et al. |

It is certified that error appears in the above-identified patent and that said Letters Patent is hereby corrected as shown below:

Col. 13, line 30, please insert the word --the-- as indicated below:

...between --the-- first...

Signed and Sealed this

Twenty-seventh Day of March, 2007

JON W. DUDAS
*Director of the United States Patent and Trademark Office*